US008151348B1

(12) United States Patent
Day

(10) Patent No.: US 8,151,348 B1
(45) Date of Patent: Apr. 3, 2012

(54) AUTOMATIC DETECTION OF REVERSE TUNNELS

(75) Inventor: Mark Stuart Day, Milton, MA (US)

(73) Assignee: Cisco Technology, Inc., San Jose, CA (US)

(*) Notice: Subject to any disclaimer, the term of this patent is extended or adjusted under 35 U.S.C. 154(b) by 2042 days.

(21) Appl. No.: 10/881,613

(22) Filed: Jun. 30, 2004

(51) Int. Cl.
*H04L 29/06* (2006.01)

(52) U.S. Cl. ............... 726/22; 726/13; 726/14; 726/25; 713/154; 709/224

(58) Field of Classification Search ................ None
See application file for complete search history.

(56) References Cited

U.S. PATENT DOCUMENTS

| | | | | |
|---|---|---|---|---|
| 5,708,714 | A * | 1/1998 | Lopez et al. ............... | 713/180 |
| 5,923,849 | A * | 7/1999 | Venkatraman ............... | 709/224 |
| 6,363,489 | B1 * | 3/2002 | Comay et al. ............... | 726/22 |
| 6,412,001 | B1 * | 6/2002 | Wong et al. ............... | 709/224 |
| 6,519,703 | B1 * | 2/2003 | Joyce ............... | 726/22 |
| 6,614,800 | B1 * | 9/2003 | Genty et al. ............... | 370/464 |
| 7,068,640 | B2 * | 6/2006 | Kakemizu et al. ............ | 370/349 |
| 7,080,151 | B1 * | 7/2006 | Borella et al. ............... | 709/230 |
| 7,116,681 | B1 * | 10/2006 | Hovell et al. ............... | 370/466 |
| 7,346,926 | B2 * | 3/2008 | Vaarala et al. ............... | 726/14 |
| 7,389,412 | B2 * | 6/2008 | Sharma et al. ............... | 713/153 |
| 7,453,850 | B2 * | 11/2008 | Yang et al. ............... | 370/331 |
| 7,567,504 | B2 * | 7/2009 | Darling et al. ............... | 370/216 |

OTHER PUBLICATIONS

Wang, Haining. Shin, Kang G. "Transport-Aware IP Routers: A Built-In Protection Mechanism to Counter DDoS Attacks". IEEE Transactions on Parallel and Distributed Systems. vol. 14, Issue: 9. Pub Date: Sep. 2003. Relevant pp. 873-884. Found on the World Wide Web at: http://ieeexplore.ieee.org/stamp/stamp.jsp?tp=&arnumber=1233710.*
Dennis Fisher, "Defending the Core", Mar. 1, 2004, http://www.eweek.com/print_article/0,1761,a=120465,00.asp.
Waltham, Mass.—(Business Wire)-Mar. 29, 2004-, "Healthcare Provider Takes Action to Proactively Combat Growing Industry Problem", http://64.233.161.104/search?q=cache:1q6IfQ4_zMJ:home.businesswire.com/portal/site/altavista/index.jsp%3FndmViewID%3Dnews_view%26newsID%3D20040329005098%26newsLang%3Den+intrusic+%2Bzephon&hl=en.
Mudge, "Insider Threat" ;login: The Usenix Magazine, Dec. 2003, vol. 28, No. 6.
Yin Zhang, Vern Paxson, Proceedings of the $9^{th}$ USENIX Security Symposium, "Detecting Stepping Stones", Aug. 2000, Denver, Colorado.

(Continued)

*Primary Examiner* — Nathan Flynn
*Assistant Examiner* — Jeremiah Avery
(74) *Attorney, Agent, or Firm* — BainwoodHuang

(57) ABSTRACT

Presently disclosed are methods and apparatus for analyzing packets and packet flows to detect covert communications channels (including reverse tunnels) in real time. These systems actively probe a suspicious connection in ways that are not possible in prior art log-based techniques and may initiate countermeasures against discovered covert channels. The present system may be implemented in a network device, such as an intrusion detection system, content engine, or other intermediary device employing a web cache. Embodiments automatically detect suspicious activity at particular source addresses by using relatively simple tests to detect suspect packets that should receive more extensive scrutiny. After more rigorous secondary testing (optionally including active probing techniques), suspect packets are either returned to the occasionally-checked state or flagged for further action, such as raising an alert or taking automatic countermeasures against the covert channel or its originators.

52 Claims, 2 Drawing Sheets

OTHER PUBLICATIONS

Yin Zhang, Vern Paxson, Proceedings of the 9$^{th}$ USENIX Security Symposium, "Detecting Backdoors", Aug. 2000, Denver, Colorado.

Vern Paxson, "Bro: A System for Detecting Network Intruders in Real-Time", Dec. 14, 1999, *Computer Networks*, 31(23-24), pp. 2435-2463.

* cited by examiner

AUTOMATIC DETECTION OF REVERSE TUNNELS

BACKGROUND

A typical computer network includes, among other things, intermediary and edge devices configured so that a user may connect to and communicate with a server or other host computer in order to exchange information. The user may also connect to network elements to communicate with a host on another network.

When a user wishes to obtain a secure communications link to a network host, the user may employ a secure communications protocol or a virtual private network (VPN). Secure communications protocols and VPNs are commonly established with the use of cooperating software and/or hardware elements in the network. For example, the SSH protocol enables encrypted communications between the user's personal computer and another computer (e.g., a host or server) by establishing a secure connection. Intermediary network devices, such as firewalls, routers, load balancers, and intrusion detection systems (IDSs), do not need to decrypt the traffic in order to process or route it and consequently are not necessarily even aware of the presence of an SSH-encrypted connection. Likewise, a VPN connection appears to the network's intermediary devices as simply another stream of packets. It too is not generally paid any special attention by the intermediary devices, other than the routine packet checking functions typically performed by IDSs and firewalls.

A virtual private network is a common example of a "tunneling" protocol being used to provide a quasi-covert communications channel embedded within standard TCP/IP traffic. In general, a tunnel embeds one communication channel within another. To the users, the VPN appears as a secure, closed network that is not easily intercepted or tampered with by others. It is not necessarily hidden or invisible, however, so it is not entirely covert.

True covert communications channels are also known: these are communications sessions embedded within other, more innocuous connections and are deliberately hidden. A reverse tunnel is an example of a true covert communications channel specifically configured for deceptive purposes, not just to hide its contents but also to hide the very existence of the channel itself. For example, a reverse tunnel may be used to conceal communications with and enable control of a compromised host by embedding an inbound communications channel to the host within an apparently outbound HTTP browsing channel from the host to the (putative) user. In this way, HTTP reverse tunnels can take advantage of subversion by network "insiders" (i.e., those who have obtained, by whatever means, root or other high-level access to the host) to provide remote operation of a compromised host on that network via what appear to be harmless outbound HTTP browsing communications.

Reverse tunnels are further described in Pieter Zatko (a.k.a. Mudge), Insider Threat Models and Solutions, Login: the USENIX Magazine, vol. 28, no. 3 (December 2003), incorporated herein by reference in its entirety. Reverse tunneling standards for use in mobile IP routing are further discussed in Reverse Tunneling for Mobile IP, Revised, Internet Request for Comments (RFC) no. 3024, G. Montenegro, ed., available on the Internet's world wide web at www[dot]networksorcery[dot]com/-enp/rfc/rfc3024[dot]txt (last viewed on May 26, 2004), incorporated herein by reference in its entirety. Clearly, the owners and administrators of such a compromised (or "zombie") host would like to be aware (at least) of such nefarious uses of their proprietary resources.

One conventional approach to detecting the presence of reverse tunnels and covert communications channels in general is to perform off-line (non-real-time) analysis of a communications session logs commonly maintained by network management systems. Such an approach is detailed in, for example, the Mudge article cited above (Insider Threat: Models and Solutions) and in Fisher, "Defending the Core," eWeek Enterprise News and Reviews (Mar. 1, 2004) available on the Internet's world wide web at www[dot]eweek[dot]com/print_article/0,1761,a=120465,00[dot]asp (last viewed on May 4, 2004), incorporated herein by reference in its entirety.

SUMMARY

Unfortunately, there are deficiencies to the above-described conventional approaches. For example, an after-the-fact analysis of logs often fails to detect the establishment and use of a covert channel until some time has elapsed, on the order of days, and often after the damage is done. Considering the potential liability of the host system owners/operators for the types of damage possibly arising from compromised hosts, such as large-scale spam assaults or Denial of Service (DoS) attacks against other hosts, such delays can be frighteningly expensive. Furthermore, the damage to the reputation of a compromised host found to be the source of such activity is also significant. What is needed is a rapid, real-time system to detect the initial establishment of covert channels and enable countermeasures before any damage can begin. This need must be tempered by the concomitant need to avoid deleterious impacts on the legitimate network traffic.

In contrast to the above-described conventional approaches, embodiments of the invention are directed to detecting and analyzing covert communications channels (including reverse tunnel) in real time to provide faster response time than prior, off-line, log-based analysis. Such systems may be employed alone, and are also a useful complement to a log-based analysis tools, which are generally incapable of scaling to the high-speed operations necessary to work in large networks employing many intermediary devices and corresponding logs. The present system is also capable of actively probing a suspicious connection in ways that are not possible for a log-based technique.

An intermediary network device (or software performing its functions), such as an intrusion detection system (IDS), content switch, content engine (CE), or any other intermediating device in a network may be configured according to embodiments of the present invention to automatically detect some kinds of activity that are indicative of reverse tunnels at particular IP addresses. In general, any intermediary (or intermediating) device, such as one employing a web cache, that is in the path of network traffic and interprets (i.e., is capable of understanding at least some aspects of the traffic) may be enhanced by the present invention. In some implementations, these devices may periodically apply relatively simple (i.e., computationally and overhead-wise "cheap") checks to detect candidate packets or packet flows that should receive more extensive scrutiny. The more-carefully-scrutinized packets and/or flows are (after analysis) either returned to the occasionally-checked state or marked for further action. In particular, exemplary embodiments of the present system distinguish between three classes of flows (as identified by the packet's IP source addresses): "ordinary," "suspicious," and "flagged." Every IP address starts classified as "ordinary."

For packets classified as "ordinary," the processing emphasis is on low overhead, low-complexity evaluation. The intermediary device examines each incoming connection request from each source address against zero or more filters for suspicious behavior. Source addresses on an administrator-configurable "permitted" list may have zero tests run. Alternatively (or additionally), the number of tests and/or the source address to be tested may be selected statistically, i.e., with a frequency of less than unity for each possible test. In the latter case, it is possible that some source addresses may not be tested at all, others evaluated by only a single test, and still other evaluated with multiple tests. The frequency of application and the specific parameters of each test may also be configured by the system administrator using conventional network management systems and interfaces. Various approaches to configuring a battery of tests for probabilistic application are well-known in the art and not further discussed herein.

In some embodiments of the invention, the intermediary device may rotate among these filters, apply them to only a sampling of incoming requests, or employ a combination of approaches. For example, but not by way of limitation, the operator may choose to configure the system to arrange filter combinations according to a threat frequency distribution and pick particular filters randomly so as to match that distribution. The operator may also adjust the parameters to ensure that at least some requests are judged "suspicious" but the overhead imposed on the average request is acceptable.

In the "suspicious" regime (i.e., once a request or connection/flow represented by the current packet is classified suspicious, based on the above testing), the intermediary device may apply either pre-determined or statistically-selected combinations of filters to every request from the suspicious source address, and may, in some embodiments, keep a longer packet trace and connection history. The device may also apply additional filters that are too expensive (computationally and/or overhead- or latency-wise) to apply widely. It may also apply active probing techniques, such as limiting the bandwidth available to one connection and determining if the source IP opens another connection. If the application of these additional techniques does not detect a reverse tunnel (according to one or more configurable thresholds), the source IP address is returned to the "ordinary" classification. If the additional techniques appear to confirm that the connection is a reverse tunnel, the source address/flow is classified as "flagged." An alert may be raised or automatic actions taken such as blocking access from the flagged source address and/or its associated MAC address (as determined via an optional query to the enterprise's DHCP server).

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present system are directed to techniques for detecting covert communications channels embedded or hidden in routine computer network connections. The system may be implemented in any network device, including but not limited to an intermediary network device (or software performing its functions), such as an intrusion detection system (IDS), content engine (CE), or any other device employing a web cache.

Although a network-connected intermediating device employing a cache is described, those skilled in the art will realize that intermediary devices other than a content switch, content engine, IDS, or other physical box can be used and that the web caching function may be provided by many devices well-known in the networking and content distribution arts. For example, the functions described herein may be implemented in software running on an arbitrary network device, or by a combination of hardware and software. Accordingly, the invention is not limited to any particular type of network device or web cache.

Figure 1:
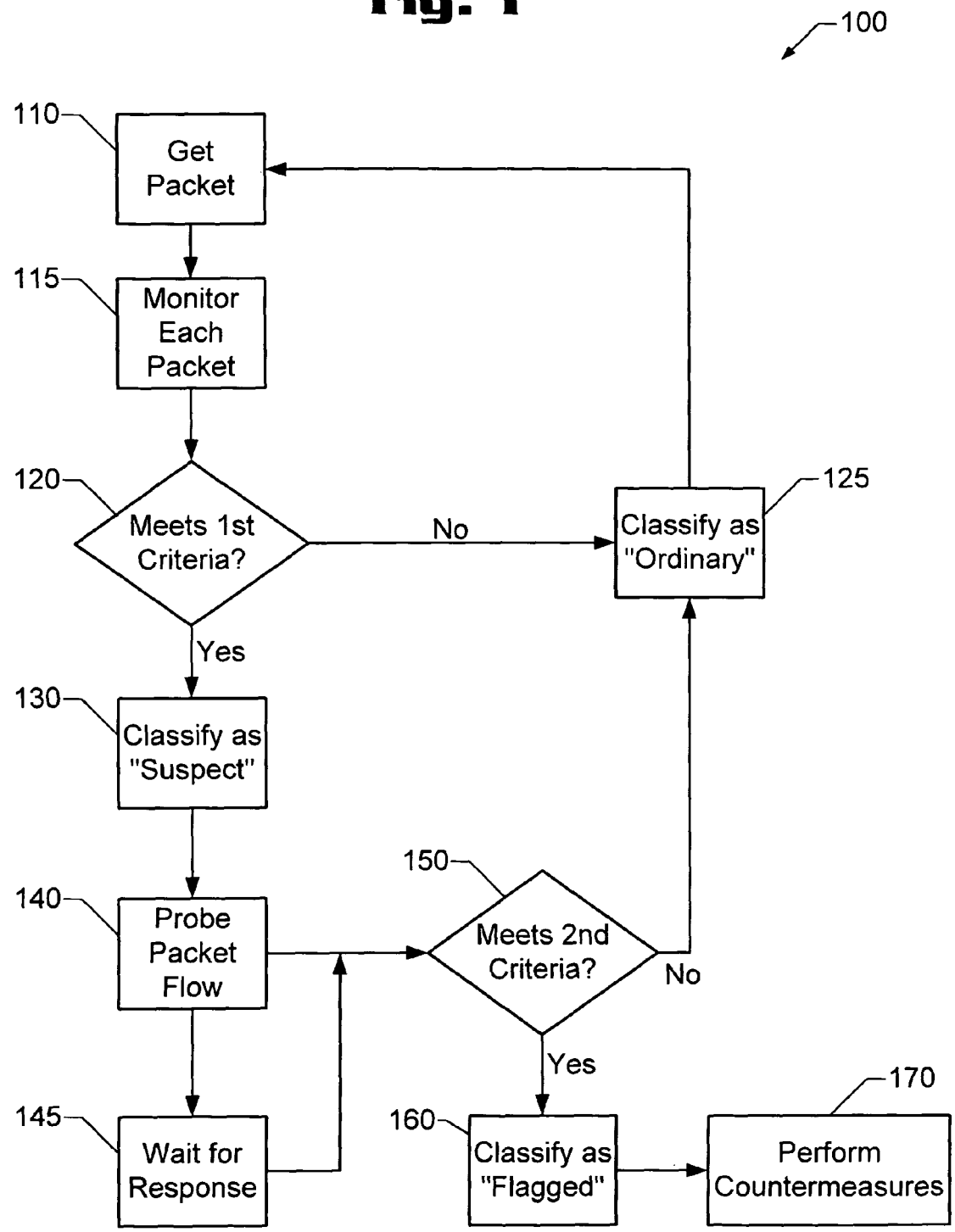
FIG. 1 is a flowchart of a process for detecting covert communications channels in a network according to one embodiment of the present invention.

FIG. 1 illustrates a flowchart of a process 100 for detecting covert communications channels, such as reverse tunnels. The process begins at step 110, which gets individual packets from a packet stream received by a network monitoring device. (Network monitoring devices are discussed in further detail with respect to FIG. 2, below.) Each individual packet is read (i.e., monitored) in step 115. Each packet is then tested 120 against zero or more preliminary tests (collectively referred to herein as "first criteria") to determine whether that packet is suspicious. "Suspicious," in this context, refers to a determination of whether or not the packet and/or its source address (or, in some implementations, its encompassing packet flow) has certain primary characteristics (discussed in more detail below) indicative of packets containing a reverse tunnel or other covert communications channel.

It is important to note that the packet monitoring and testing described with respect to process 100 is conducted in real-time as each packet is received in the monitoring device. Incidental buffering during processing does not significantly affect either the communications channel monitored nor cause appreciable delay in the classification and/or re-classification of monitored packets. In general, monitoring 115 and classification steps 120 and 125 are "low touch," low overhead, high-speed activities that are designed to identify suspicious packets for further analysis. This preliminary identification process is not intended to provide a definitive classification of the packets and packet flows, but rather to reduce the number of packets and packet flows prior to high accuracy classification, which necessarily has a somewhat higher overhead impact on the monitoring device.

In addition, test 120 may employ statistical sampling or probabilistic testing of packets. Accordingly, not all packets are necessarily tested against all or even any tests or filters (hence, the possibility of "zero" preliminary tests). Test parameters are individually configurable using means well-known in the art, such as but not limited to operator commands, system programmability, network management systems, and the like and may each include configurable thresholds or sensitivity settings. Preliminary tests or filters suitable for use in the first criteria tests 120 may include:

1. Duration: has the connection (represented by the current packet) been open longer than n minutes (where time n is configurable)?
2. Flow direction: has this connection uploaded significantly more bits to the server than the server has sent to the client (where the threshold for "significantly more" bits is configurable)?
3. Initial data: was the connection opened with data that is atypical for a browser connection (where the data signatures indicative of atypical data are configurable)?

4. Periodic requests: have previous connections from this client occurred at regular intervals (where the connection request and establishment history and accuracy statistics are configurable)?

One of ordinary skill in the art will appreciate that the universe of potential tests that may be run in step 120 is very wide. The above list is a starting point for selecting a low-overhead, base set for use as a first stage determination of "suspicious" packets. Similar tests are well-known in the art and are further described in Y. Zhang and V. Paxson, *Detecting Stepping Stones*, Proc. 9$^{th}$ USENIX Security Symposium, Aug. 14-17, 2000; Y. Zhang and V. Paxson, *Detecting Backdoors*, Proc. 9$^{th}$ USENIX Security Symposium, Aug. 14-17, 2000; and V. Paxson, *Bro: A System for Detecting Network Intruders in Real-Time*, Computer Networks 31 (23-24), pp. 2435-2463, (Dec. 14, 1999), all of which are incorporated herein by reference in their entireties. Conventionally, the Zhang and Paxson stepping stone and backdoor tests have been conducted only after suspicious activity has been identified, and then only on off-line log files. The "Bro" system paper, while disclosing real-time operations, does not discuss detecting covert communications channels.

In a further alternate embodiment of the present system, individual tests may be selected for application based on a frequency distribution that selects an individual test randomly but according to an overall minimum frequency value for all tests. In a still further alternative embodiment, the system may select more than one (or even zero) tests. Such statistical sampling techniques for choosing among candidates are well-known in the art.

If the packet fails test 120, (or, if no test is run due to probabilistic non-selection) it is classified 125 as "ordinary" and considered non-threatening. Process 100 then loops to step 110 to get another packet. Note that process 100 may operate in a pipeline manner or may be instantiated multiple times, thereby allowing parallel processing of packets in the packet stream. Accordingly, step 110 need not necessarily get the next sequential packet in the packet stream. This situation arises when more than one packet in a flow is required to assemble the element being tested, for example, if a particular HTTP header is of interest and happens not to be contained in a single packet.

If, on the other hand, the packet meets the criterion (or criteria) that defines a "suspicious" packet in step 120, the packet is classified as "suspect" in step 130. At this point, further operations on the suspicious packet may proceed in parallel. The source address responsible for sending the suspicious packet may be probed, in some embodiments, in step 140. Packet flow probing may employ multiple techniques to elicit responses from the source address to confirm or to rule out the presence of a covert communications channel. These techniques are defined by a set of pre-determined and/or administrator-configurable probe vectors that identify the source address target, the probing tool, and specific parameters unique to the situation. For example, but not by way of limitation, packet flow probing may employ well-known networking identification and tracing tools such as (but not limited to) to ping, ident, or traceroute.

In general, active probing techniques depend on adjusting packet flow timing, since the intermediary device (content switch, CE, etc.) does not typically have enough information to reliably determine the nature and semantics of the suspected reverse tunnel. Adjustments in timing can delay and/or drop packets to keep bandwidth below a specified rate, or can increase the variance in delay times so that some packets are delivered very quickly while others are delayed a long time. As noted above, it may be significant if these adjustments cause additional flows to be opened. Other active probing techniques, such as but not limited to the following examples, depend on suspecting a particular kind of attack and knowing its usual progress.

1. If the covert channel appears to be of the kind used by a known zombie of the style that checks in with a master periodically, send the known "zombie checking in" message and see if an ACK comes from the master.
2. If it appears to be a known password-file attack, deliver a fake password file (e.g., /etc/passwd) and see if an attempted login using that data follows.
3. If the covert channel appears to be facilitating (or carrying data for) a known file-sharing system, advertise upload/storage space availability and determine if an upload follows that matches the parameters advertised. Here, in general, conventional honeypot techniques can be used to "lure in" this type of attack. The key difference is that the network device is effectively serving as a "virtual honeypot" for a wide variety of machines reachable through it.
4. In some cases, it may be sensible to replay a packet or a sequence of packets back to the "attacking" host as if the replayed packets were being sent from a different IP address to determine how the counterpart behaves.

Packet probing 140 is also carried out in real-time: probing packets are constructed from predefined and/or predetermined probe vectors (e.g., stored in the form of scripts or other stored program instructions) and transmitted without operator intervention.

After each probe, process 100 waits for the sender's response in step 145 and then tests the responsive packet against one or more high-accuracy secondary criteria for determining the presence of a covert communications channel in the packet at step 150.

Secondary testing step 150 may also be performed without first probing the packet or its encompassing flow via step 140. Once a packet is classified as "suspect" in step 130, the high-accuracy criteria of step 150 may be applied directly to the packet, its source address, and/or its encompassing packet flow.

If the packet does not meet the criteria of step 150, it is re-classified as an "ordinary" packet, step 125, and process 100 loops to step 110 to get another packet. If, however, the packet meets the criteria of step 150, packet is re-classified as "flagged," denoting a packet containing a covert communications channel, in step 160.

Secondary testing step 150 may employ, as in preliminary testing step 120, statistical sampling techniques to select zero or more tests to run on each suspicious packet. However, as the goal of secondary testing 150 is high-accuracy vetting of packets already classified as suspicious in order to detect whether a covert communications channel is present, both the frequency and probabilistic thresholds are higher. Furthermore, the probability of running multiple tests may also be configured to approach (or reach) unity, in order to ensure high-confidence detection.

Flagged packets and their corresponding source addresses may then be designated, in some embodiments of the invention, for countermeasures to be performed in step 170. Countermeasures may include such active and passive techniques as immediate flow termination, off-line or online alerting to any or all of the affected host computers and/or their administrators, initiating a blacklist or blocking of all flows from the flagged packet's source address or source flow, full recording or logging of the communications session (such as via use of the well-known tcpdump tool), redirection to a "honeypot" or similar diagnostic/forensic tools, or initiation of a retaliatory strike. The system may also redirect multiple distinct suspicious flows (originally destined for different computers) so that they are instead converged on a single, shared honeypot that is emulating the original different computers.

Figure 2:
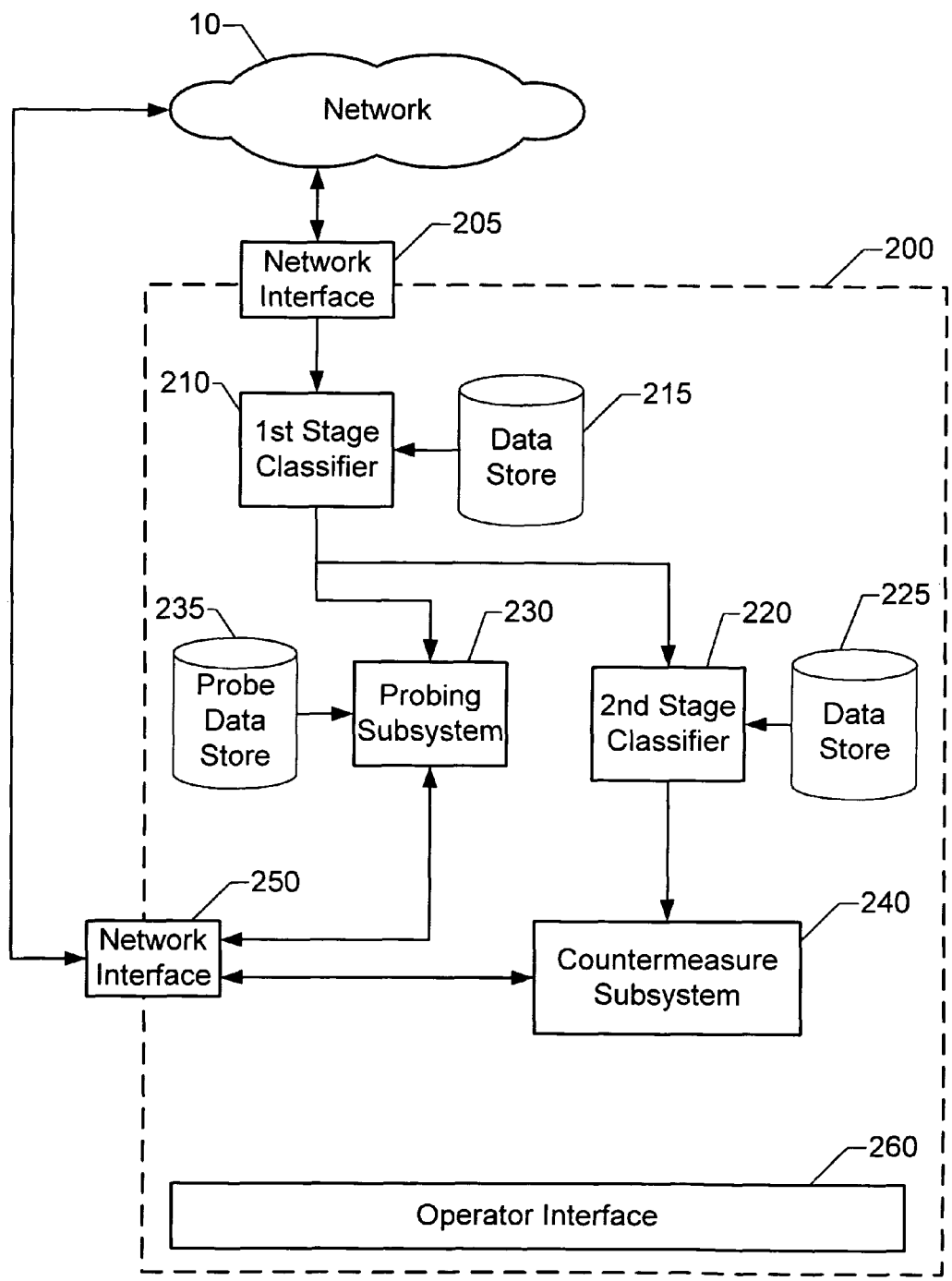
FIG. 2 is a high-level block diagram of a computer apparatus for detecting covert communications channels in a network according to one embodiment of the present invention.

FIG. 2 is a high-level block diagram of an apparatus 200 for monitoring a network, and (in particular) for determining if a covert communications channel has been concealed in a particular packet or packet flow, according to one embodiment of the present invention. Apparatus 200 consists of a first stage classifier 210, a second stage classifier 220, a probing subsystem 230, and an optional countermeasures subsystem 240. First stage classifier 210 is connected to a memory or storage device (also referred to herein as a data store) 215 containing a set of criteria by which incoming packets (monitored through network interface 205) are evaluated to determine whether they originate from a suspicious source address or belong to a suspect packet flow. Note that data store 215 may consist of any conventional memory device or circuit implementing a memory function, such as (but not limited to) RAM, ROM, disk, or any variety of storage now known or to be discovered in the future.

Although a monitoring device or apparatus 200 is described as a stand-alone unit, those skilled in the art will realize that both stand-alone and integrated implementations may be used to embody the functions described herein. Accordingly, the invention is not limited to any particular device implementation. For example, but not by way of limitation, the functions of monitoring device 200 may be implemented as a separate unit attached to a network 10 (such as the Internet or a private intranet of any size) or within an intrusion detection sensor (IDS), firewall, gateway, load balancer, or server as these devices are known and used in the art today. In one implementation, device 200 may be attached to a web cache in a content distribution network and configured to read and analyze temporarily-cached packets in real time.

Each packet classified by first stage classifier 210 as "suspect" is sent to two other units for further processing: the packet and its containing packet flow information (such as, but not limited to, its source address) are passed to second stage classifier 220 as well as to probing subsystem 230. Processing in second stage classifier 220 and probing subsystem 230 may proceed in parallel. In some implementations of the present system, the second stage classifier 220 may operate without resort to or input from probing subsystem 230.

Packets not found to be suspect are considered (i.e., classified as) "ordinary" and are disregarded.

Second stage classifier 220 compares each suspect packet to a second set of criteria, which is stored in another data store or memory 225. Packets that fail this second, more rigorous classification step, are classified (or "flagged") as containing a covert communications channel, such as a reverse tunnel. The second set of evaluation criteria may employ some or all of the same criteria stored in first classifier 210's data store 215 as well as additional and/or combined criteria from data store 225 to evaluate suspect packets and their encompassing packet flows. Packets that fail the second classification step are thus flagged for further processing, potentially including the initiation of active countermeasures against the covert communications channel, discussing further detail below.

On the other hand, packets that pass the second classification step are considered (classified) "ordinary" after all. Such packets (and their source addresses and/or encompassing flows) are disregarded and not subject to additional processing.

A practitioner of the network arts will also appreciate that the functions of first stage classifier 210 and second stage classifier 220 are not necessarily implemented in separate devices or circuits. Rather, these functions may be combined into any of a number of well-known devices such as, but not limited to, dedicated packet or network processors, custom ASICs or programmable logic devices. Associated data stores 215 and 225 may likewise be incorporated into such devices or combined into a single data store available to all functional elements of device 200. Alternatively, these functions (as well as other functions of monitoring device 200) may be performed by software or a combination of hardware and software operating on any of a number of well-known computer processing devices.

As noted above, suspect packets are also sent to probing subsystem 230. This subsystem generally operates in parallel with second stage classifier 220, although (in some embodiments) probing subsystem 230 may be allowed to complete its operations prior to initiation of the re-classification function performed by second stage classifier 220. Probing subsystem 230 utilizes data store 235, which contains templates and/or scripts that define particular active tests and probing packets to be sent from monitoring device 200 (via network interface 250) to network 10. These probing packets are transmitted to the source of the suspect packet flow in order to elicit a response from the transmitting host that will further identify the nature of the flow and whether or not it contains a covert communications channel (such as a reverse tunnel) or other encrypted data. As discussed above with respect to data stores 215 and 225, data store 235 may be a separate memory element or combined with other memory devices or memory functions within device 200.

One of ordinary skill in the art will appreciate that network interface 250, used by probing subsystem 230, may be the same as or different from network interface 205 used by first stage classifier 210. Put in other terms, there may be one or more interfaces to network 10 in monitoring device 200. In addition, since monitoring device 200 may be a separate, intermediary device connected to and monitoring network 10 or a component of a network device used in a network, monitoring device 200 may not require its own, discrete network interfaces at all. For example, but not by way limitation, if monitoring device 200 is implemented as part of an IDS, packets and packet flow information will be already available for analysis in the IDS' web cache memory. Accordingly, in such an implementation, monitoring device 200 would not require any additional network interfaces.

Countermeasures subsystem 240 includes hardware and/or software configured to execute one or more pre-determined actions (such as scripts) against the covert communications channel. These countermeasures may be performed against the packet flow containing the covert channel and/or its source address. Since it too must send packets into network 10, countermeasures subsystem 240 may share network interface 250 or have its own network interface (not shown). Furthermore, as noted above, a separate, discrete network interface need not be provided for countermeasures subsystem 240 when other means of accessing network 10 are available to monitoring device 200. Countermeasure subsystem 240 may be implemented using conventional network devices and functions, such as packet generators and communications protocol tools.

Also provided within monitoring device 200 is an operator interface 260 to first and second stage classifiers 210 and 220, as well as to probing subsystem 230, countermeasures subsystem 240, network interfaces 205 and 250 (when present), and data stores 215, 225, and 235. Operator interface 260 provides the capability for a system operator to set both the first and second stage classification criteria as well as to adjust configurable thresholds for determining when a packet is to be classified as ordinary, suspect, or flagged. The statistical or probabilistic distribution functions governing how often and when each test in the preliminary or secondary classifiers 210 or 220 may be controlled via operator interface 260. Furthermore, operator interface 260 may also be configured to provide alarming and/or reporting functions to describe status, statistics, and covert communications channel identification events. As these types of operator interface and control functions are well-known in the art, as in (for example) the various operations and maintenance (OAM) and network device operating systems, they will not be discussed further.

Alternate Embodiments

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While this invention has been particularly shown and described with references to embodiments thereof, it will be understood by those skilled in the art that various changes in form and details may be made therein without departing from the spirit and scope of the invention as defined by the appended claims.

I claim:

1. A method of detecting a covert communications channel in a network, comprising:
   monitoring in real-time a plurality of packets in said network, each said packet belonging to a packet flow having a flow identifier;
   classifying each said packet into a first category if said packet meets a first criterion indicative of the presence of said covert communications channel and into a second category otherwise, wherein said classifying comprises using one or more tests; and
   for each of said packets classified into said first category, probing said packet in real-time, wherein said probing comprises re-classifying each said packet into a third category if said packet meets a second criterion indicative of said covert communications channel,
   wherein said re-classifying comprises using one or more additional tests;
   wherein said covert communications channel is a reverse tunnel; and
   wherein said classifying comprises randomly selecting according to a frequency distribution a subset of the one or more tests to apply to each said respective packet.

2. The method of claim 1, wherein said classifying employs said flow identifier.

3. The method of claim 1, wherein said classifying further comprises using said classifying of prior packets in said packet flow to classify each said packet into said first category.

4. The method of claim 1, wherein said probing employs said flow identifier.

5. The method of claim 1, wherein said re-classifying employs said flow identifier.

6. The method of claim 1, wherein at least one of said tests comprises determining whether the packet represents a connection open longer that a predetermined amount of time.

7. The method of claim 1, wherein at least one of said tests comprises determining whether the packet represents a connection that has uploaded more bits by an amount that is greater than a predetermined threshold from a client to a server than from said server to said client.

8. The method of claim 1, wherein at least one of said tests comprises determining if the packet represents a connection that was opened with data that includes predetermined data signatures.

9. The method of claim 1, wherein at least one of said tests comprises determining whether the packet represents a connection related to previous connections from a client that were opened at regular intervals.

10. The method of claim 1, wherein said probing comprises modifying the timing of said packets in said packet flow using one or more probe vectors.

11. The method of claim 1, further comprising, for each of said packets classified into said third category, performing countermeasures against the covert communications channel.

12. An apparatus for monitoring a network, comprising:
   a first classifier configured to monitor a plurality of packets from said network, each packet belonging to a packet flow having a flow identifier; and
   a first data store operably connected to said first classifier, said first data store comprising one or more first classification criteria,
   wherein said first classifier compares each packet in said plurality of packets to at least one of said first classification criteria to determine a first classification for each said corresponding packet, said first classification determining one or more selected packets;
   a second classifier configured to receive said selected packets from said first classifier; and
   a second data store operably connected to said second classifier, said second data store comprising one or more second classification criteria,
   wherein said second classifier compares each said selected packet to at least one of said second classification criteria to determine a revised classification for each said selected packet, said revised classification determining one or more marked packets;
   a probing subsystem configured to receive said selected packets from said first classifier; and
   a third data store operably connected to said probing subsystem, said third data store comprising one or more predetermined probe vectors,
   wherein said probing subsystem injects packets into said network in response to each said selected packet from said first classifier and waits for a response from said network, and wherein said response or lack thereof is also used by said second classifier to determine said revised classification; and
   wherein said covert communications channel is a reverse tunnel; and
   wherein said first classifier, when comparing each packet in said plurality of packets to the at least one of said first classification criteria to determine the first classification for each said corresponding packet, is configured to randomly select, according to a frequency distribution, a subset of said first classification criteria to apply to each said respective packet.

13. The apparatus of claim 12, wherein said first classification criteria employs said flow identifier.

14. The apparatus of claim 12, wherein said first classifier employs said first classification of prior packets in said packet flow to determine said first classification for each said corresponding packet.

15. The apparatus of claim 12, wherein said probing subsystem employs said flow identifier.

16. The apparatus of claim 12, wherein said second classification criteria employs said flow identifier.

17. The apparatus of claim 12, wherein said first criteria comprises whether the packet represents a connection open longer that a predetermined amount of time.

18. The apparatus of claim 12, wherein said first criteria comprises whether the packet represents a connection that has uploaded more bits by an amount that is greater than a predetermined threshold from a client to a server than from said server to said client.

19. The apparatus of claim 12, wherein said first criteria comprises whether the packet represents a connection that was opened with data that includes predetermined data signatures.

20. The apparatus of claim 12, wherein said first criteria comprises whether the packet represents a connection related to previous connections from a client that were opened at regular intervals.

21. The apparatus of claim 12, wherein said probing subsystem comprises means for modifying the timing of said packets in said packet flow using said one or more probe vectors.

22. The apparatus of claim 12, further comprising a countermeasures subsystem configured to receive said marked packets from said second classifier and to perform countermeasures against said covert communications channel.

23. An apparatus for detecting a covert communications channel in a network, comprising:
  means for monitoring in real-time a plurality of packets in said network, each said packet belonging to a packet flow having a flow identifier;
  means for classifying each said packet into a first category if said packet meets a first criterion indicative of the presence of said covert communications channel and into a second category otherwise, wherein said means for classifying comprises means for using one or more tests; and
  means for probing each of said packets classified into said first category in real-time, wherein said means for probing comprises means for re-classifying each said packet into a third category if said packet meets a second criterion indicative of said covert communications channel,
  wherein said means for re-classifying comprises means for using one or more additional tests; and
  wherein said covert communications channel is a reverse tunnel; and
  wherein said means for using one or more tests comprises means for randomly selecting, according to a frequency distribution, a subset of the one or more tests to apply to each said respective packet.

24. The apparatus of claim 23, wherein said means for classifying employs said flow identifier.

25. The apparatus of claim 23, wherein said means for classifying further comprises means for using said classifying of prior packets in said packet flow to classify each said packet into said first category.

26. The apparatus of claim 23, wherein said means for probing employs said flow identifier.

27. The apparatus of claim 23, wherein said means for re-classifying employs said flow identifier.

28. The apparatus of claim 23, wherein at least one of said tests comprises determining whether the packet represents a connection open longer that a predetermined amount of time.

29. The apparatus of claim 23, wherein at least one of said tests comprises determining whether the packet represents a connection that has uploaded more bits by an amount that is greater than a predetermined threshold from a client to a server than from said server to said client.

30. The apparatus of claim 23, wherein at least one of said tests comprises determining if the packet represents a connection that was opened with data that includes predetermined data signatures.

31. The apparatus of claim 23, wherein at least one of said tests comprises determining whether the packet represents a connection related to previous connections from a client that were opened at regular intervals.

32. The apparatus of claim 23, wherein said means for probing comprises modifying the timing of said packets in said packet flow using one or more probe vectors.

33. The apparatus of claim 23, further comprising means for performing countermeasures for each of said packets classified into said third category against the covert communications channel.

34. A non-transitory computer-readable medium storing a computer program executable by a plurality of server computers, the computer program comprising computer instructions, which, when carried out by a server computer of the plurality of server computers, cause the server computer to perform the operations of:
  monitoring in real-time a plurality of packets in said network, each said packet belonging to a packet flow having a flow identifier;
  classifying each said packet into a first category if said packet meets a first criterion indicative of the presence of said covert communications channel and into a second category otherwise, wherein said classifying comprises using one or more tests; and
  for each of said packets classified into said first category, probing said packet in real-time, wherein said probing comprises re-classifying each said packet into a third category if said packet meets a second criterion indicative of said covert communications channel,
  wherein said re-classifying comprises using one or more additional tests; and
  wherein said covert communications channel is a reverse tunnel; and
  wherein said classifying comprises randomly selecting according to a frequency distribution a subset of the one or more tests to apply to each said respective packet.

35. The computer-readable medium of claim 34, wherein said computer instructions for classifying employ said flow identifier.

36. The computer-readable medium of claim 34, wherein said computer instructions for classifying further comprise computer instructions for using said classifying of prior packets in said packet flow to classify each said packet into said first category.

37. The computer-readable medium of claim 34, wherein said computer instructions for probing employ said flow identifier.

38. The computer-readable medium of claim 34, wherein said computer instructions for re-classifying employ said flow identifier.

39. The computer-readable medium of claim 34, wherein at least one of said tests comprises determining whether the packet represents a connection open longer that a predetermined amount of time.

40. The computer-readable medium of claim 34, wherein at least one of said tests comprises determining whether the packet represents a connection that has uploaded more bits by an amount that is greater than a predetermined threshold from a client to a server than from said server to said client.

41. The computer-readable medium of claim 34, wherein at least one of said tests comprises determining if the packet represents a connection that was opened with data that includes predetermined data signatures.

42. The computer-readable medium of claim 34, wherein at least one of said tests comprises determining whether the packet represents a connection related to previous connections from a client that were opened at regular intervals.

43. The computer-readable medium of claim 34, wherein said computer instructions for probing comprise computer instructions for modifying the timing of said packets in said packet flow using one or more probe vectors.

44. The computer-readable medium of claim 34, further comprising, for each of said packets classified into said third category, computer instructions for performing countermeasures against the covert communications channel.

45. The method of claim 1, wherein said probing comprises:
  sending a probing packet to a source of said packet flow for each said packet in a first category;
  receiving a responsive packet from said source, wherein said responsive packet is sent in response to said probing packet; and
  categorizing said responsive packet into said third category if said responsive packet meets said second criterion indicative of said covert communications channel, wherein said categorizing said responsive packet comprises using one or more additional tests.

46. The apparatus of claim 12, wherein said probing comprises:
  sending a probing packet to a source of said packet flow for each said packet in a first category;
  receiving a responsive packet from said source, wherein said responsive packet is sent in response to said probing packet; and
  categorizing said responsive packet into said third category if said responsive packet meets said second criterion indicative of said covert communications channel, wherein said categorizing said responsive packet comprises using one or more additional tests.

47. The apparatus of claim 23, wherein said means for probing comprises:
  means for sending a probing packet to a source of said packet flow for each said packet in a first category;
  means for receiving a responsive packet from said source, wherein said responsive packet is sent in response to said probing packet; and
  means for categorizing said responsive packet into said third category if said responsive packet meets said second criterion indicative of said covert communications channel, wherein said means for categorizing said responsive packet comprises means for using one or more additional tests.

48. The computer-readable medium of claim 34, wherein said computer instructions for probing comprises:
  computer instructions for sending a probing packet to a source of said packet flow for each said packet in a first category;
  computer instructions for receiving a responsive packet from said source, wherein said responsive packet is sent in response to said probing packet; and
  computer instructions for categorizing said responsive packet into said third category if said responsive packet meets said second criterion indicative of said covert communications channel, wherein said computer instructions for categorizing said responsive packet comprises computer instructions for using one or more additional tests.

49. The method of claim 1, wherein for each said packet classified into said first category, said probing is performed after said classifying.

50. The method of claim 1, wherein said classifying utilizes less overhead than said probing.

51. The method of claim 1, wherein said probing each said packet includes tracing said packet flow of said packet.

52. The method of claim 1, wherein said probing each said packet includes delivering a fake password file and determining if an attempted login using data from the fake password file follows.

* * * * *